Patented May 13, 1930

1,758,348

UNITED STATES PATENT OFFICE

FREDERICK L. BENEDETTI, OF BLACK DIAMOND, WASHINGTON

COMPOSITION FOR SOLDERING ALUMINUM WARE

No Drawing. Application filed May 16, 1928. Serial No. 278,347.

This invention relates to a method of and composition for effecting the soldering of aluminum ware.

The composition consists of an admixture of comminuted, or pulverized, copper or brass and aluminum with an oil.

The proportions of the metal ingredients, by bulk measurement which I use is about as follows:—two-thirds of brass to one-third of aluminum. These two ingredients are thoroughly mixed together and with a small quantity of oil, preferably olive oil, to provide a mass of a dough-like consistency.

For use, the surface of the aluminum ware is first cleaned by filing or scraping, then a small quantity of the above described composition is applied with arsenic (or another suitable flux) to such cleaned surface.

A heated soldering-iron is then used with a reciprocatory movement upon the composition and flux to bring the same to a burning point which is indicated by its change in color.

A solder, such as known as lead-solder is then applied to the above described coating and is thereupon treated by means of a soldering-iron or other known methods to effect the soldering of the work.

The proportions here given of the ingredients of the composition are not arbitrary, as they may be changed considerably without materially affecting the composition or process.

What I claim, is:—
The composition herein described for use in applying solder to aluminum ware, comprising a mixture of comminuted aluminum and brass in about the proportion of two-thirds and one-third respectively, with a small quantity of olive oil to form a mass of dough-like consistency.

Signed at Black Diamond, Washington, this 18th day of April, 1928.

FREDERICK L. BENEDETTI.